United States Patent [19]

Yonemori et al.

[11] Patent Number: 4,627,720

[45] Date of Patent: Dec. 9, 1986

[54] VARIABLE MAGNIFICATION IMAGE PROJECTOR

[75] Inventors: Takaji Yonemori, Tokyo; Hideki Adachi, Kawasaki, both of Japan

[73] Assignee: Canon Kabushiki Kaisha, Tokyo, Japan

[21] Appl. No.: 778,166

[22] Filed: Sep. 18, 1985

Related U.S. Application Data

[63] Continuation of Ser. No. 717,470, Mar. 28, 1985, which is a continuation of Ser. No. 565,368, Dec. 27, 1983, abandoned.

[30] Foreign Application Priority Data

Jan. 6, 1983 [JP] Japan ..................................... 58-181

[51] Int. Cl.[4] ...................... G03B 27/34; G03B 27/40; G03B 27/70

[52] U.S. Cl. ......................................... 355/57; 355/66

[58] Field of Search ....................... 355/55, 56, 57, 58, 355/66

[56] References Cited

U.S. PATENT DOCUMENTS 3,832,058 8/1974 Gusovius .............................. 355/56
3,873,189 3/1975 Whitaker et al. .
3,972,056 7/1976 Tsusimoto et al. .................. 355/57
4,080,062 3/1978 Torigai et al. ........................ 355/57
4,149,792 4/1979 Fraser .
4,215,922 8/1980 Szabo et al. .
4,348,089 9/1982 Shenk .
4,420,248 12/1983 Ogawa et al. ........................ 355/57

FOREIGN PATENT DOCUMENTS 2099164 12/1982 United Kingdom .

*Primary Examiner*—Monroe H. Hayes
*Attorney, Agent, or Firm*—Fitzpatrick, Cella, Harper & Scinto

[57] ABSTRACT

An image projector is adapted to change the magnification of a projected image by moving a zoom lens with its focal length being changed, wherein the zoom lens is moved to and then stopped at a goal position from the initial position in the first direction. When it is desired to move the zoom lens to another goal position in the second direction opposite to the first direction as viewed from the initial position, the zoom lens is once moved to its reversal position beyond the second goal position and thereafter moved from the reversal position to the second goal position.

32 Claims, 8 Drawing Figures

| MAGNIFICATION (%) | CLOK PULSE NO. FROM REF. POSITION |
|---|---|
| 142 | 0 |
| 141 | 7 |
| 140 | 15 |
| 139 | 23 |
| 102 | 389 |
| 101 | 401 |
| 100 | 413 |
| 99 | 425 |

VARIABLE MAGNIFICATION IMAGE PROJECTOR

This application is a continuation of application Ser. No. 717,470 filed Mar. 28, 1985 now abandoned, which in turn is a continuation of original patent application Ser. No. 565,368 filed Dec. 27, 1983, now abandoned.

BACKGROUND OF THE INVENTION

1. Field of the Invention

The present invention relates to an apparatus for projecting the image of an original on a photosensitive member with a selected magnification using a zoom lens.

2. Description of the Prior Art

There are known systems in which the magnification of an image to be projected onto a photosensitive member will be changed by the use of a zoom lens, for example, from U.S. Pat. Nos. 3,765,760; 4,046,467; and 4,077,710 and U.K. Patent Application Nos. 2,016,732 and 2,073,899. In such systems, the magnification of the projected image is changed by moving the zoom lens with its focal length being varied. As will be well known in the art, the focal length of a zoom lens will be changed by moving at least one of the lens elements, constituting the zoom lens system, relative to at least another one of the lens elements along the optical axis of the zoom lens.

The movement of the zoom lens is different in the moving direction between when the image is enlarged and when it is reduced. On the other hand, the lens moving means and focal-length changing means are constructed by combining various mechanical components. This means that some play, backlash or the like between each adjacent components cannot be avoided. As a result, the lens element of the zoom lens will more easily create an error when it is moved in the second direction, if it is designed to move correctly in the first direction. This may provide an unclear image projected on the photosensitive member, an improper magnification and so on.

To overcome such problems, the technique described in U.S. Ser. No. 505,962 now Pat. No. 4,521,100 which is the U.S. counterpart of West Germany Patent Application No. 3322857.4 can be utilized to provide an apparatus in which a reference position is provided on the path of the zoom lens at one end and wherein if it is desired to change the magnification, the zoom lens is necessarily moved once into abutment with the above reference position and then run from the reference position to a position corresponding to the desired magnification. In such an apparatus, the zoom lens always reaches and stops at its goal position in the same direction whenever the magnification is to be changed. Accordingly, the positional errors of the zoom lens and associated zoom ring and others are equalized for any positions of the zoom lens. For this purpose, the zoom lens will be set with respect to its positions and focal length in consideration to these positional errors, so that an optical system including this zoom lens does not vary in focus condition, magnification and so on. In such an arrangement, however, the zoom lens must be moved necessarily once to its reference position on each change of magnification. Thus, it requires an increased time period for changing the magnification. For example, where the reference position of the zoom lens is at a position corresponding to its maximum magnification and if it is desired to form an image with a reduced magnification and then to form another image with another reduction smaller than the above reduced magnification only by a few percentages, the zoom lens which has been placed at a position remote from the reference position must be again returned to the same reference position and then moved to a position corresponding to the desired magnification to set the zoom lens to desired magnification. This will be time consuming when it is required to position the zoom lens relative to the desired magnification.

SUMMARY OF THE INVENTION

It is an object of the present invention to provide a variable magnification image projecting apparatus which can set a zoom lens exactly with respect to its position and focal length to provide the desired magnification thereof.

Another object of the present invention is to provide a variable magnification image projecting apparatus which can reduce the period of time required to position a zoom lens properly with respect to its position and focal length.

Other objects and features of the present invention will be appear from reading the following description with reference to the accompanying drawings.

DESCRIPTION OF THE PREFERRED EMBODIMENTS

Figure 1:
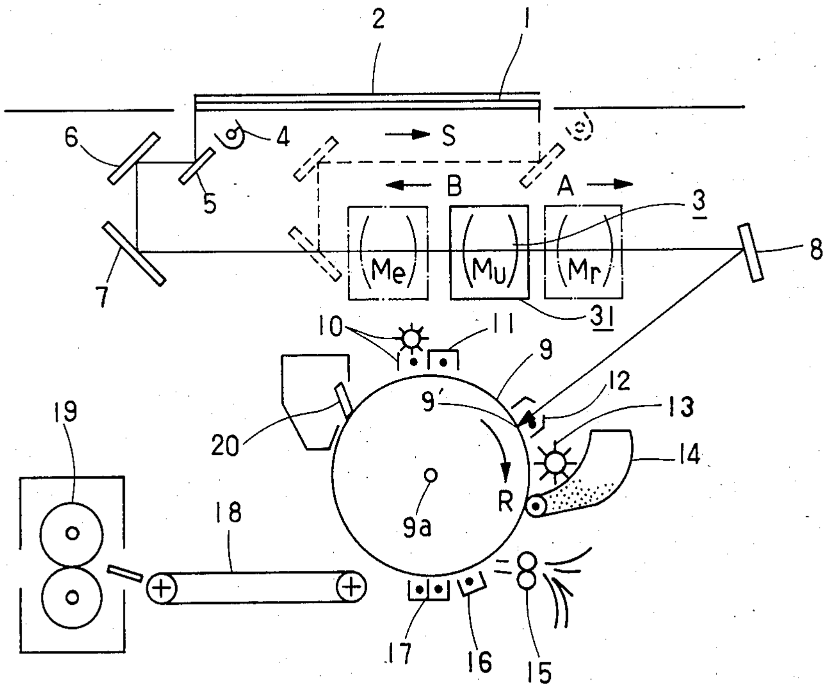
FIG. 1 illustrates an electrophotographic copying system to which the present invention can be applied.

FIG. 1 shows one example of variable magnification electrophotographic copying systems to which the present invention can be applied. Referring to FIG. 1, an original to be copied 2 is shown to be placed on a transparent carriage 1. The original 2 is illuminated by a lamp 4 to form an image which is in turn projected and imaged on a drum-like electrophotographic type photosensitive member 9, which is rotated about a shaft 9a in the direction shown by arrow R, through mirrors 5, 6 and 7, a zoom lens 3 and a mirror 8 at an exposure station 9'. The lamp 4 and mirrors 5, 6 and 7 are moved in the direction of arrow S to scan the original. The speed ratio of the mirror 5 to the mirrors 6 and 7 is set to be 2:1 so that the optical path length from the original 2 to the lens 3 will be maintained constant. The lamp 4 is moved at the same speed as that of the mirror 5. The speed of the mirror 5, that is the original scanning speed is changed to match the desired magnification of an image to be projected. Accordingly, the speed of the mirrors 6 and 7 also is changed depending upon the desired magnification. After the original 2 has been scanned, the components 4, 5, 6 and 7 are returned to their initial positions.

After the photosensitive member 9 has been charge-removed by a pre-exposure lamp/pre-charge remover 10, the member 9 is uniformly charged by a primary charger 11. Subsequently, the photosensitive member 9 is charged by a secondary charger 12 at the same time as the image of the original 2 is projected thereon at the exposure station 9' as described hereinbefore. Thereafter, the photosensitive member 9 is subjected to an exposure by means of a whole exposure lamp 13 to form an electrostatic latent image thereon. This electrostatic latent image on the photosensitive member 9 is then developed by a development device 14 to form a toner image. A transfer sheet, on the other hand, is fed onto the photosensitive member 9 from paper feed means (not shown) in timed relation with the formation of the toner image by means of registration rollers 15. This transfer sheet has its size corresponding to the desired magnification. The toner image on the photosensitive member 9 is then transferred to the fed transfer sheet by means of a transfer charger 16. The transfer sheet now having thereon the transferred toner image is then separated from the photosensitive member 9 under the action of a separation charge remover 17 and fed into a fixing device 19 by means of a conveyor belt 18. At the fixing device 19, the toner image is fixed to the transfer sheet. The photosensitive member 9 which has been subjected to a separation charge removal, is then cleaned by a drum cleaner 20 with the remaining toner particles on the photosensitive member 9 being removed so that the photosensitive member 9 will be ready for the next cycle.

In FIG. 1, symbol Mu shows the position of the zoom lens 3 when the image of the original 2 is to be formed in its real size; Me denotes the position of the zoom lens 3 when the image of the original 2 is to be formed in a enlarged scale (magnification of me); and Mr designates the position of the zoom lens 3 when the image is to be formed in a reduced scale (magnification of mr). Although FIG. 1 shows only three positions of the zoom lens 3, the present invention can selectively move the zoom lens 3 to one of more than three positions such that the magnification of copy, that is, the magnification of the image will be changed by the increment of one percent.

Now suppose that a reduction is instructed after a copy has been effected at the position Me of the zoom lens 3 corresponding to the enlargement magnification me. Thus, the zoom lens 3 is moved in the direction of arrow A in FIG. 1 and set at its position Mr corresponding to the reduction magnification mr. At the same time, the focal length of the zoom lens 3 also is changed in association with the movement thereof. At this time, the zoom lens 3 is moved only in the direction of arrow A and stopped at the position corresponding to the desired reduction magnification by control means which will be described.

If it is desired to obtain a copy in its real size after the reduction copy has been carried out, the zoom lens 3 must be moved from the position Mr to the position Mu in the direction of arrow B which is opposite to the direction of arrow A. At this time, the zoom lens 3 is once moved to a position which is beyond the position Mu by a slight distance ΔD in the direction of arrow B. In other words, the zoom lens 3 is first moved in the direction of arrow B by a distance corresponding to the sum of the distance between the positions Mr and Mu and the above distance ΔD. Subsequently, the zoom lens 3 is moved back from the position by a distance ΔD in the direction of arrow A and then stopped thereat. At the same time, the focal length of the zoom lens 3 also is changed to one corresponding to the one-to-one magnification in association with the movement thereof.

Now suppose that a magnification m' is to be changed to another selected magnification m. Also assume that the entire optical path length from the original 2 through the zoom lens 3 to the photosensitive member 9 is L and that the optical path length from the original 2 to the initial position of the zoom lens 3 corresponding to the magnification m' is $h_1'$ and that the optical path length from the initial position of the zoom lens 3 to the photosensitive member 9 is $h_2'$ with the focal length of the zoom lens 3 being F'. Further assuming that the optical path length from the original 2 to the goal position of the zoom lens 3 corresponding to the magnification m is $h_1$ and that the optical path length from the goal position of the zoom lens 3 to the photosensitive member 9 is $h_2$ with the focal length of the zoom lens 3 being F. Then, $$h_1'+h_2'=h_1+h_2=L,\ h_2'/h_1'=m',\ h_2/h_1=m.$$

From these, $$h_2 = mL/(1+m) \qquad h_1 = L/(1+m)$$

$$h_2' = m'L/(1+m') \quad h_1' = L/(1+m')$$

Therefore, the distance D between the initial position of the zoom lens 3 and the goal position to which it is to be shifted is:

$$D = h_2 - h_2' = (m-m')L/(1+m)(1+m') \tag{1}$$

$$\begin{cases} 1/F = 1/h_1' + 1/h_2' \\ 1/F = 1/h_1 + 1/h_2. \end{cases}$$

From these formulas, $$F=m'L/(1+m')^2 F=mL/(1+m)^2 \tag{2}$$

If m' is larger than m, the goal position of the zoom lens 3 is far in the direction of arrow A as viewed from the initial position thereof. In this case, the zoom lens 3 may be set at its goal position by moving it from its initial position (corresponding to the magnification m') to the goal position spaced away therefrom by a distance |D| in the direction of arrow A. At the same time, the focal length of the zoom lens 3 also is changed from F' to F in association with the movement thereof.

On the other hand, if m' is smaller than m, the goal position of the zoom lens 3 is in the direction of arrow B as viewed from the initial position thereof. In this case, the zoom lens 3 is moved from its initial position corresponding to the magnification m' in the direction of arrow B by a distance (|D|+ΔD) where ΔD is a positive value corresponding to the excess distance and constant independently of the value (m−m'). Subsequently, the zoom lens 3 is moved by a distance ΔD in the direction of arrow A. Thus, the zoom lens 3 will be set at its goal position corresponding to the magnification m while at the same time the focal length of the zoom lens will be changed from F' to F in association with the movement thereof.

It is understood from the foregoing that if it is desired to change the magnification, the zoom lens always approaches the goal position in the same direction. Therefore, the zoom lens can exactly be positioned in any goal position while at the same time the focal length thereof can properly be set at a value corresponding to that goal position. Thus, the present invention can overcome such a disadvantage that the goal position and focal length of a zoom lens will be varied depending upon the direction in which the zoom lens is moved from its initial position to its goal position. Further, the time required to change the magnification can be reduced since the zoom lens need not necessarily be returned to its reference position upon each change of magnification.

In the present embodiment, after a power switch is closed to energize the system and before the system is enabled for its copying operation (the image of the original illuminated by the lamp 4 is projected onto the photosensitive member), the zoom lens 3 is once moved to its reference position and then shifted to a position corresponding to the desired magnification. If a plurality of changes in magnification are repeatedly carried out, errors relating to the position and focal length of the zoom lens may be accumulated due to inertia and other factors in the zoom lens and its drive means. Where the zoom lens is once returned to its reference position and then moved therefrom to a position corresponding to the desired magnification as described hereinbefore, however, the above accumulation of errors can be eliminated to improve the accuracy of the zoom lens with respect to the position and focal length thereof upon the change of magnification. In the present embodiment, said reference position may be established at the end of the path of lens in the direction of arrow B. However, the reference position may be set at any location such as the end of the path in the direction of arrow A, a position corresponding to a particular magnification and so on. As described above, the reference magnification in the present embodiment is in a ratio of one to one since the original is most frequently copied in the one-to-one magnification. However, the reference magnification may be in one of the other ratios.

In the aforementioned embodiment, further, the zoom lens is moved only in the direction of arrow A when the goal position of the zoom lens corresponding to the selected magnification m is in the direction of arrow A as viewed from the initial position thereof corresponding to the previous magnification m'. On the other hand, the zoom lens is once moved to its turnaround position beyond the goal position thereof and then traveled from the turnaround position to that goal position in the direction of arrow A. If the goal position of the zoom lens is in the direction of arrow B as viewed from the initial position thereof, however, the zoom lens may be moved to that goal position only in the direction of arrow B. Also, if the goal position of the zoom lens is in the direction of arrow A as viewed from the initial position thereof, the zoom lens may be once moved to the turnaround position beyond that goal position in the direction of arrow A and then traveled from the turnaround position to that goal position in the direction of arrow B.

After the zoom lens 3 has been positioned in a position corresponding to the desired magnification m with the focal length thereof being correspondingly set, an operator gives a copy instruction to the copying system such that the photosensitive member 9 will be initiated to rotate in the direction of arrow R. Subsequently, the lamp 4 and movable mirror 5 are moved together in the direction of arrow S at a speed equal to 1/m times the peripheral speed of the photosensitive member 9 while at the same time the movable mirrors 6 and 7 are scanningly moved in the direction of arrow S at a speed equal to ½m times the peripheral speed of the photosensitive member 9. The image of the original 2, which is being illuminated by the lamp 4, is imaged on the photosensitive member 9 through the zoom lens 3 with the magnification m.

Figure 2:
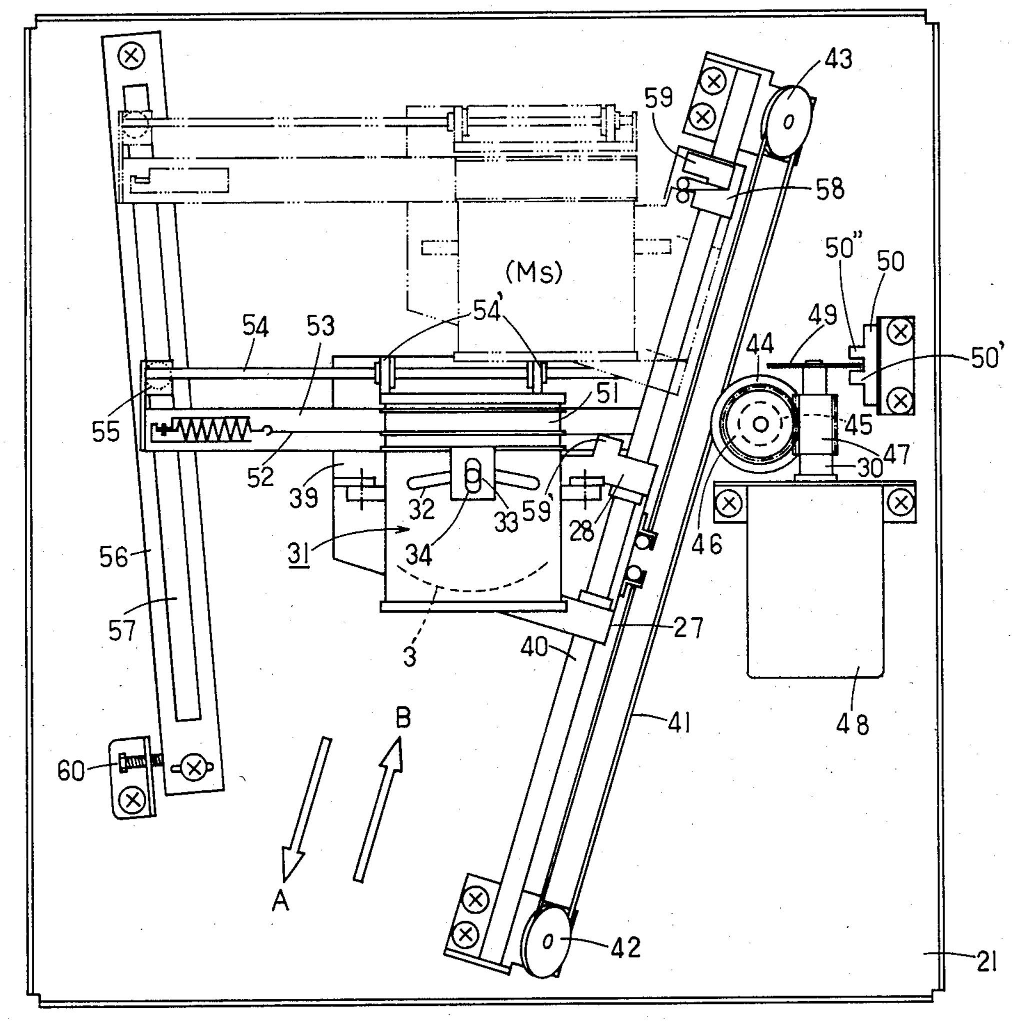
FIG. 2 is a plan view showing the primary part of one embodiment of the present invention.

FIG. 2 exemplifies lens drive means and focal-length changing means in which the movement of the zoom lens and the change of the focal length thereof are effected by the drive of a single motor 48. Referring to FIG. 2, the zoom lens 3 shown in FIG. 1 is contained in a lens barrel 31 which is fixed to a lens carriage 39. The lens carriage 39 includes slide bearings 27 and 28 fixed thereto, which bearings are slidably mounted on a linear guide rail 40. This guide rail 40 is fixedly mounted on a base plate 21 which is fixed to the stationary part of the copying system. Thus, the lens carriage 39 carrying the zoom lens 3 can be reciprocated along the linear guide rail 40 in the directions of arrows A and B which are parallel to the guide rail 40. In this connection, the guide rail 40 defining the movement of the zoom lens 3 is disposed slantingly relative to the optical axis of the zoom lens 3 for the purpose that in any magnification of copy, the side edge of the original may be positioned to match the corresponding side edge of the original carriage 8, that is, the side reference position so that the image thereof will be imaged on the reference position at the side edge of the photosensitive member. Therefore, if the central part of the original is always to be imaged on the central portion of the photosensitive member, the rail 40 may be disposed parallel to the optical axis of the zoom lens 3.

The lens carriage 39 includes a wire 41 fixed thereto which is spanned around pulleys 42 and 43 and further wound around a pulley 44 at a position intermediate between the pulleys 42 and 43. The pulley 44 is connected with a worm wheel 46 through a torque limiter 45 which is adapted to slip when the load thereon exceeds a predetermined value.

The worm wheel 46 is engaged by a worm gear 47 which is fixedly mounted on the output shaft 30 of a reversible DC motor 48. If the DC motor 48 is energized to rotate in the rearward direction, the pulley 44 is rotated clockwise through the worm gear 47, worm wheel 46 and torque limiter 45. Thus, the lens carriage 39 carrying the zoom lens 3 is moved by the movement of the wire 41 in the direction of arrow A. If the DC motor 48 is energized to rotate in the forward direction, the pulley 44 will be rotated counterclockwise so that the lens carriage 39 is moved by the wire 41 in the direction of arrow B.

The output shaft 30 of the DC motor 48 carries an encoder disc 49 including a number of slits which are formed therein around the outer periphery of the disc 49 and spaced away from one another with an equal distance, these slits being of the same width and permitting light to transmit therethrough. This disc 49 is thus rotated in synchronism with the rotation of the pulley 44. As be apparent from the aforegoing, therefore, the disc 49 is rotated in association with the movement of the zoom lens 3.

The system also includes a photo-coupler 50 which includes a light emitting element 50' and a light receiving element 50'' disposed to position the slitted region of the disc 49 therebetween. When the disc 49 is rotated by the DC motor 48, light emitted from the light emitting element 50' periodically transmits each slit on the outer periphery of the disc 49. When each transmissive light is received by the light receiving element 50'', the latter generates an electric pulse. Thus, the rotational angle of the pulley 44 will not be changed throughout one pulse cycle consisting of the above train of clock pulses, and also the movement of the zoom lens 3 will be varied throughout the one pulse cycle. If it is desired to change the magnification, the DC motor 48 is first energized to initiate the movement of the zoom lens 3. In synchronism with the movement of the zoom lens 3, the train of clock pulses begins to be generated. These clock pulses are counted by a microcomputer having a counting function. When a predetermined number of clock pulses corresponding to a selected magnification is counted by the microcomputer, the DC motor 48 is immediately deenergized to stop the movement of the zoom lens 3.

In the present invention, the movement of the zoom lens 3 causes its zooming effect. For this purpose, as shown in FIG. 2, the lens barrel 31 includes a cam opening 32 formed therein which is engaged by a pin 33. The pin 33 is fixedly mounted on a focal-length changing lens retainer sleeve which is mounted in the lens barrel 31 such that the sleeve can be moved along the optical axis. A zoom ring 51 is so mounted on the lens barrel 31 that the ring will not be moved relative to the lens barrel 31 along the optical axis, but rotated thereon around the optical axis. The zoom ring 51 includes a slot 34 formed therein which is also engaged by said pin 33. Thus, if the zoom ring 51 is rotated, the pin 33 moves along the cam opening 32 to change the spacing between the lens elements within the lens barrel 31. Thus, the focal length of the zoom lens 3 will also be changed. In association with the movement of the zoom lens 3, the zoom ring 51 may be rotated by the following mechanism:

This mechanism comprises a wire 52 wound around the zoom ring 51 with the opposite ends thereof being connected with the ends of a slide member 53 and placed under tension. The slide member 53 is mounted on a slide shaft 54 which is in turn supported slidably by a slide holder 54' fixedly mounted on the lens carriage 39. At one end, the slide member 53 carries a roller 55 used as a cam follower. The roller 55 is fitted into a groove 57 formed in a cam plate 56 which is fixed to the base plate 21. Thus, if the zoom lens 3 is moved in the direction A or B, the slide member 53 also is moved together with the lens carriage 31 in the direction A or B. At this time, the slide member 53 will be moved relative to the lens carriage 31 in the direction intersecting the direction of movement in the lens carriage 31 under the reaction of the groove 57. As a result, the zoom ring 51 is rotated by means of the wire 52 so that the focal length of the zoom lens 3 will be changed by an amount corresponding to the movement of the zoom lens 3.

The mechanism also comprises an adjustment screw 60 for adjusting the inclination of the cam plate 56 relative to the direction of movement in the zoom lens, that is, the guide rail 40 to regulate the amount of zooming in the zoom lens 3.

The mechanism further comprises a switch 59 for detecting the position of the lens, which is fixedly mounted on a support member 58 fixed to the base plate 21. This switch 59 will be turned on by a projection 59' on the lens carriage 39 when the zoom lens 3 reaches its reference position Ms.

Figure 3:
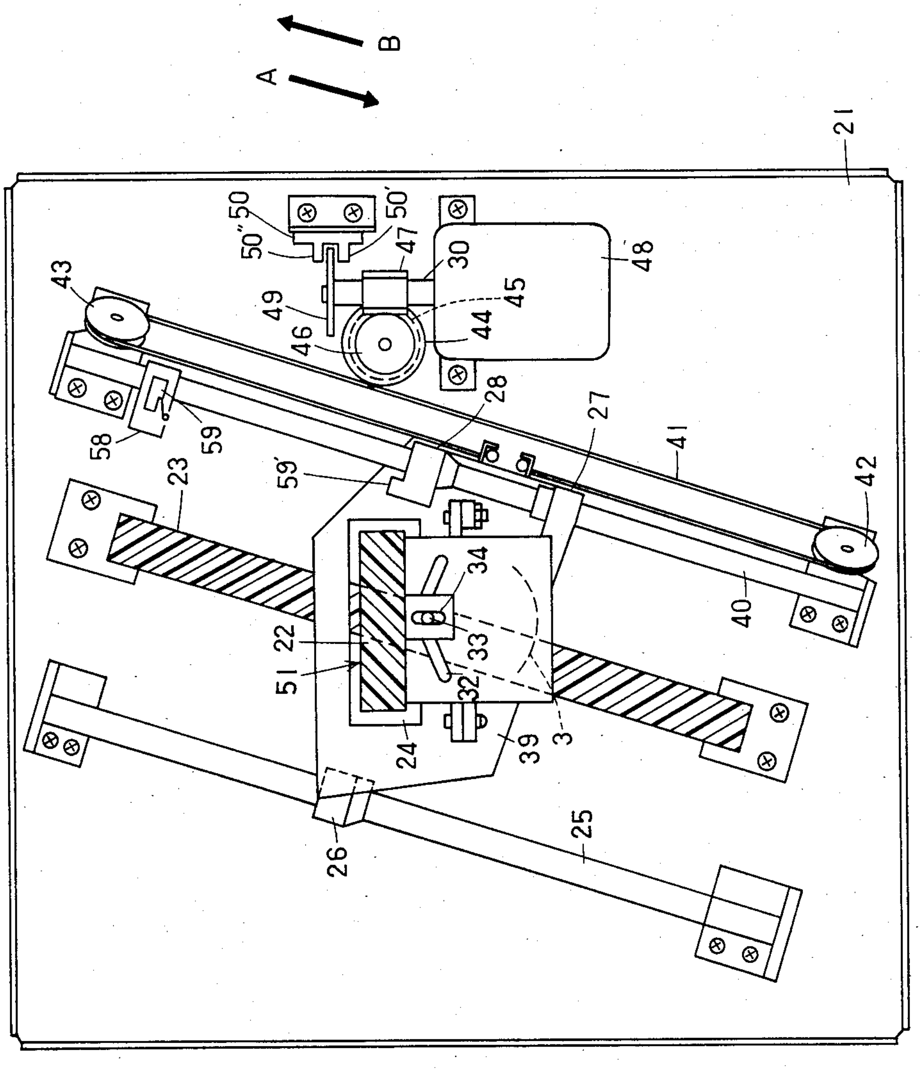
FIG. 3 is a plan view similar to FIG. 2, showing the primary part of another embodiment of the present invention.

FIG. 3 shows another embodiment of the focal-length changing means according to the present invention in which the zoom ring 51 includes a helical gear 22 formed therein. The helical gear 22 is engaged by a helical rack 23 through a slot 24 in the lens carriage 39. The helical rack 23 is fixedly mounted on the base plate 21 parallel to the rail 41, that is, the direction of movement in the zoom lens 3. Another guide rail 25 is fixedly mounted on the base plate 21 parallel to the guide rail 40 and slidably receives a slide bearing 26 which is fixedly supported by the lens carriage 39 at one end.

Referring to FIG. 3, if the motor 48 is energized to move the zoom lens 3 in the direction A or B, the zoom ring 51 is moved in the same direction as that of the zoom lens 3. Under the reaction of the helical rack 23 relative to the helical gear 22, however, the zoom ring 51 is also rotated in the direction corresponding to the movement of the zoom lens 3. In other words, the focal length of the zoom lens 3 will be changed in association with the movement of the lens under the reaction of the helical rack 23.

Figures 4, 5:
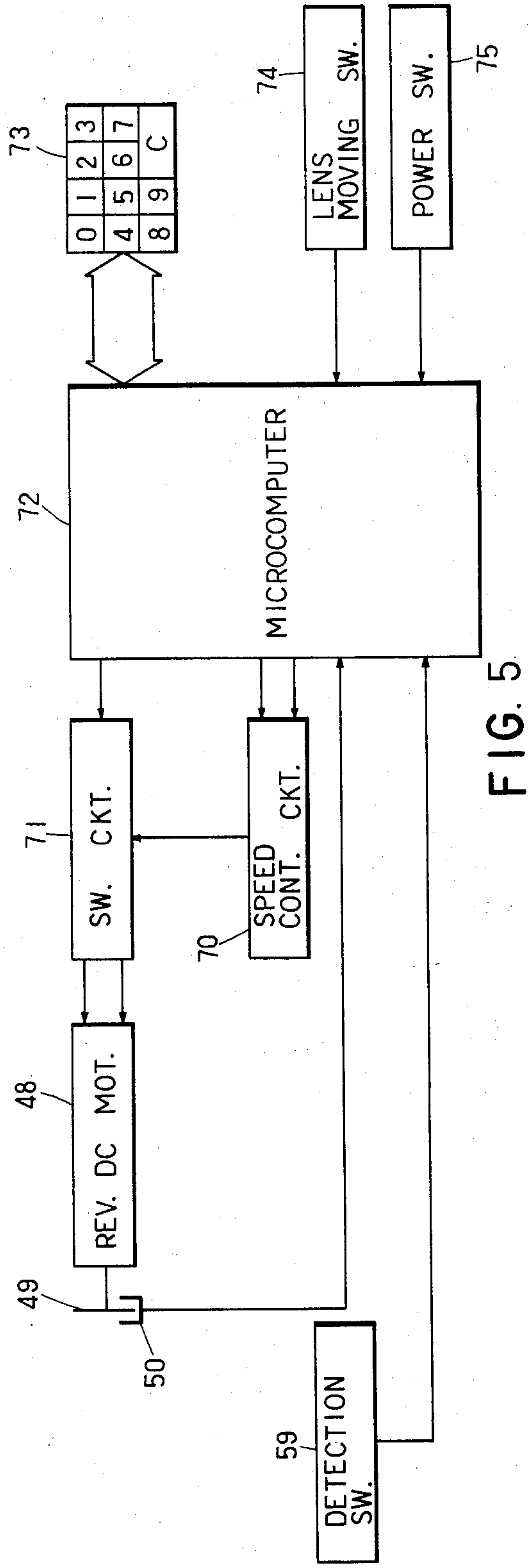
FIG. 4 is a block diagram showing a control device in one embodiment of the present invention.
FIG. 5 is a view showing part of a table which represents the relationship between the magnification and the number of clock pulses.

FIG. 4 shows a block diagram of means for controlling the aforementioned reversible DC motor 48 to change the position and focal length of the zoom lens in correspondence to a selected magnification. Referring to FIG. 4, this means comprises a circuit 71 for reversing the rotation of the servo motor 48, a circuit 70 for varying the voltage applied to the motor to control it, and a ten-key assembly 73 for specifying the desired magnification, for example, in the order of one percentage in addition to the encoder disc 49, photo-interrupter 50 and lens position detecting switch 59. The ten-key assembly 73 may be adapted to specify the desired magnification in the order of a percentage less or more than one percent. The above means also comprises a switch 74 for instructing the start of the movement of lens, a power switch 75 for connecting the copying system to a source of electric power, and a microcomputer 72 for controlling the motor 48 with respect to its speed and direction by controlling the voltage changing circuit 70 and the rotation changing circuit 71 when the microcomputer 72 receives the respective signals from the various elements 50, 59, 73, 74 and 75.

In FIG. 5, various distances from said reference position (in this embodiment, a position corresponding to 148% of the magnification) to lens positions corresponding to various magnifications are represented by the numbers of clock pulses corresponding to the respective distances. These clock pulses are generated by the photo-interrupter 50 during the rotation of the encoder disc 49 as described hereinbefore. FIG. 5 shows only part of such selectable magnifications.

Figure 6:
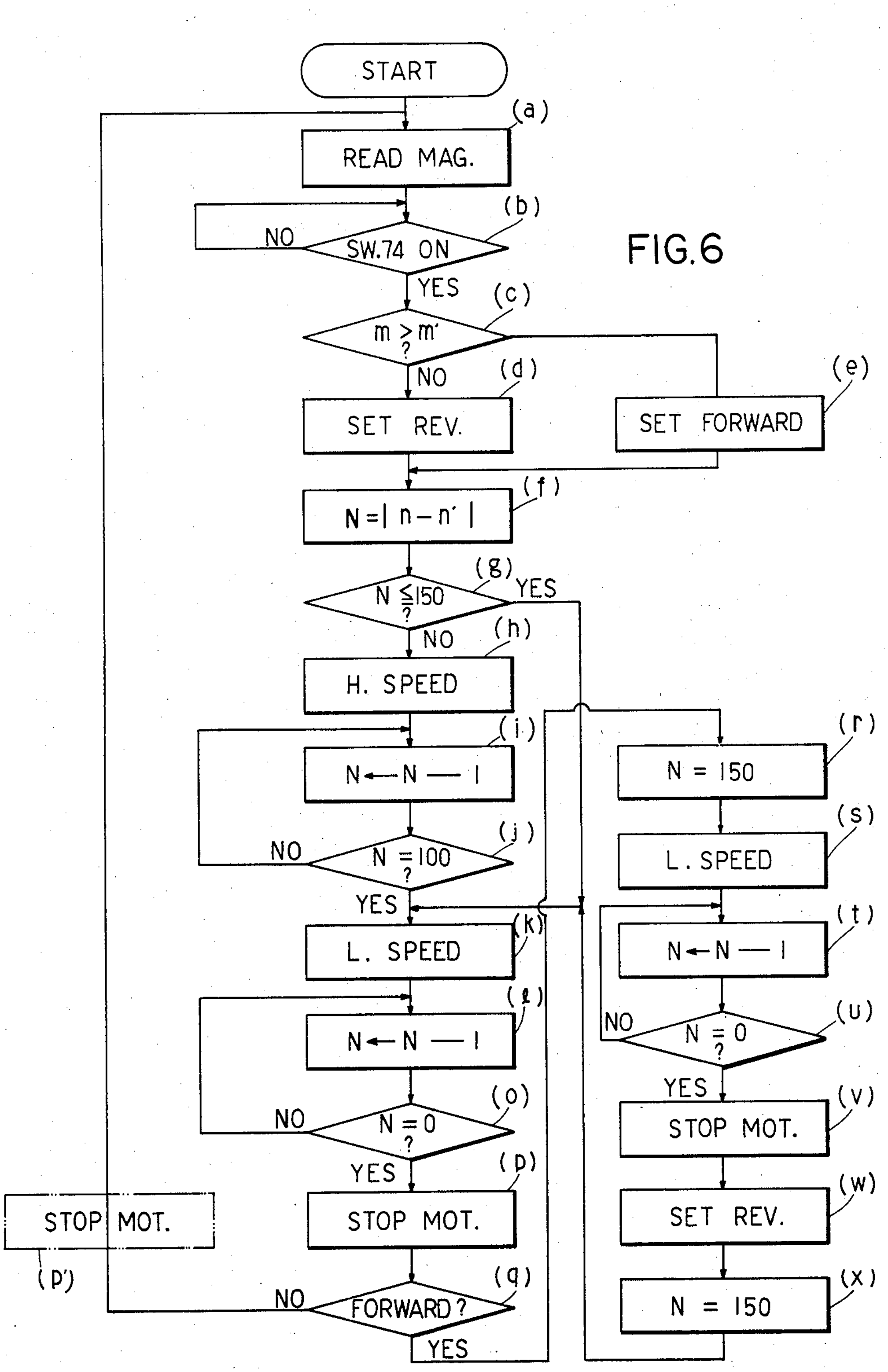
FIG. 6 is a flow chart of a control operation in one embodiment of the present invention.

FIG. 6 is a flow chart of the control operation of the microcomputer 72. The control of the motor 48 will be described with reference to FIG. 6.

Now presume that the zoom lens 3 has been set at a position corresponding to the magnification m' and then is to be set at another position corresponding to the magnification m. First of all, the operator operates the ten-key assembly 73 to specify the magnification m. This is read by the microcomputer 72 (Step a). Subsequently, the operator depresses the movement instruction switch 74 to generate a signal which is in turn inputted in the microcomputer 72 (Step b). The microcomputer 72 compares this selected magnification m with the initial magnification m' (Step c). If m is larger than m', the microcomputer 72 produces a control signal which is in turn supplied to the rotation changing circuit 71 to switch it to its position in which the servo motor 48 will be rotated forwardly (Step e). If m is smaller than m', the microcomputer 72 generates another control signal which is used to switch the rotation changing circuit 71 into another position in which the servo motor 48 will be rotated rearwardly (Step d).

The microcomputer 72 has stored data relating to various different distances between the positions of the lens corresponding to various different magnifications and the reference position in the form of the number of clock pulses. Then, the microcomputer 72 picks out, from its memory, the number n' of clock pulses corresponding to a distance d' between the position of the lens corresponding to the initial magnification m' and the reference position and the number n of clock pulses corresponding to a distance d between the position of the lens corresponding to the selected magnification m and the reference position. Based on these values, the microcomputer 72 calculates $N=|n-n'|$ which is in turn set in its own counter section (Step f). The calculated and set number of clock pulses N corresponds to a distance D, that is, $|d-d'|$ over which the zoom lens 3 is to be moved. Therefore, the number $|n-n'|$ corresponds to a distance between the initial and goal positions of the zoom lens.

The microcomputer 72 now compares the number of clock pulses $|n-n'|$ with a preset comparison number of clock pulses, for example, 150 (Step g). If $|n-n'|$ is larger than 150, the microcomputer 72 will produce a control signal which is in turn supplied to the voltage changing circuit 70 such that the servo motor 48 will be rotated at a higher speed (Step h). If $|n-n'|$ is equal to or smaller than 150, the microcomputer 72 generates another control signal which is in turn used to switch the voltage changing circuit 70 into its position in which the servo motor 48 will be rotated at a lower speed (Step k).

The rotation of the motor 48 causes the movement of the lens 3 which causes the photo-interrupter 50 to generate clock pulses. These clock pulses are applied to the microcomputer 72 which in turn decrements the number of clock pulses N set in its counter section upon each reception of clock pulses.

Thus, if the motor initiates rotation at the higher speed in Step h, that is, if the zoom lens is initiated to move, the number of clock pulses N begins to be decremented (Step i). If the difference between the number of clock pulses $|n-n'|$ initially set in the counter section and the number of clock pulses n'' generated after the lens has begun to move becomes equal to 100 ($|n-n'|-n''=100$), the motor 48 is changed to rotate at the lower speed (Steps j and k). If the decrement is continued until the above difference becomes equal to zero, the voltage changing circuit 70 is controlled to stop the rotation of the motor 48 so that the zoom lens 3 will be stopped at its goal position (Steps l, o and p). At this time, the focal length of zoom lens 3 has been changed to a value corresponding to the selected magnification m. In Step g, it is discriminated whether the motor 48 is rotated in either of the forward and rearward directions. If the rearward rotation of the motor 48 is detected, the copying system is placed in its standby position until it receives an instruction for the start of the copying operation or immediately initiates a copying operation in the selected magnification m.

If it is discriminated in Step d that the motor 48 is rearwardly rotated and when it is judged in Step g that the number of clock pulses $|n-n'|$ is smaller than 150, the program enters to Step k directly from Step g. Thereafter, Steps l, o, p and q are executed such that the zoom lens 3 will be positioned at its goal position with the focal length thereof being set at a value corresponding the selected magnification m. It is of course that if the motor 48 is rotated at a higher speed, the zoom lens is moved with the focal length thereof being changed in the corresponding higher speed. If the motor 48 is rotated at a lower speed, the zoom lens will be moved with the focal length thereof being changed in the corresponding lower speed. Thus, if the goal position of the zoom lens is in the direction of arrow A as viewed from the initial position thereof and when the distance D between the initial and goal positions is larger than the distance Ds corresponding to the number of clock pulses (150), the zoom lens 3 is first moved at the higher speed and then changed to the lower speed. When the zoom lens 3 reaches the goal position, it is stopped. The above position in which the zoom lens 3 is changed in speed is spaced away from the goal position by a distance Dc measured in the direction of arrow B. This distance Dc corresponds to the number of clock pulses (100). On the other hand, if the goal position is in the direction of arrow A as viewed from the initial position and when the distance between the initial and goal positions is smaller than the distance Ds, the zoom lens 3 is initially moved to that goal position at the lower speed. If the zoom lens 3 is to be moved through an increased distance as described hereinbefore, the zoom lens 3 may be moved to its intermediate position at the higher speed and then traveled from the intermediate position to the goal position at the lower speed. Thus, the operation for changing the magnification may be reduced in time and the zoom lens may exactly be positioned with the focal length thereof being precisely changed.

On the other hand, if the zoom lens 3 is to be moved through a decreased distance, it may initially be moved at the lower speed so that the zoom lens will properly be positioned with the focal length thereof being correctly changed.

Although the previous embodiments have been described as to the distance Ds larger than the distance Dc, these distances Ds and Dc may be equal to each other. In this case, Step j discriminates whether or not the remaining number of clock pulses ($=|n-n'|-n''$) up to the count-up becomes equal to 150.

If the goal position is in the direction B as viewed from the initial position, the forward rotation of the motor 48 is set in Step e. The subsequent program will proceeds following the same procedure up to Step g as in the previously described procedure, except that the motor 48 is forwardly rotated to move the zoom lens 3 in the direction B. After Step g, however, the program proceeds to Step r in which the microcomputer 72 will set the number of clock pulses (for example, 150) corresponding to said distance ΔD in its counter section. At Step s, the motor 48 is initiated to rotate forwardly at the lower speed. During this, the number of clock pulses set in the counter section is decremented at Step t. If it is discriminated at Step u that the zoom lens 3 is moved to a position corresponding to the set number of clock pulses (150), that is, to the reversal position in the direction B, the motor 48 is stopped at Step v. At Step w, the rotational direction of the motor 48 is set rearwardly. At Step x, further, the number of clock pulses corresponding to the distance ΔD between the above reversal position and the goal position is set to be 150. Thereafter, the program is executed following said steps k, l, o, p and q so that the zoom lens 3 will be moved to the goal position from the reversal position in the direction A. At the same time, the focal length of the zoom lens 3 will also be changed to a value corresponding to the selected magnification m.

In this case, the accuracy of the zoom lens with respect to its goal position and focal length may be improved since it is moved to the reversal and goal positions at the lower speed.

Step p (motor stop) may be replaced by Step p' shown in FIG. 6. In this case, even if the zoom lens reaches the position corresponding to the selected magnification m in the direction B, the motor continues to be energized such that the zoom lens will be moved excessively by the distance ΔD corresponding to 150 clock pulses in the direction B.

Although the distance ΔD has been described to be set at a distance corresponding to 150 clock pulses, this distance may optionally be set within such a range that the zoom lens can exactly be positioned with the focal length thereof being properly be set. It is however preferred that the distance is at a value as small as possible since the operation of magnification change can be reduced in time.

The distances Ds and Dc may also be selected to match any different number of clock pulses from those of the aforementioned embodiments. It is also preferred that they are set at values as small as possible within the range that the position and focal length of the zoom lens can exactly be set.

Figure 7:
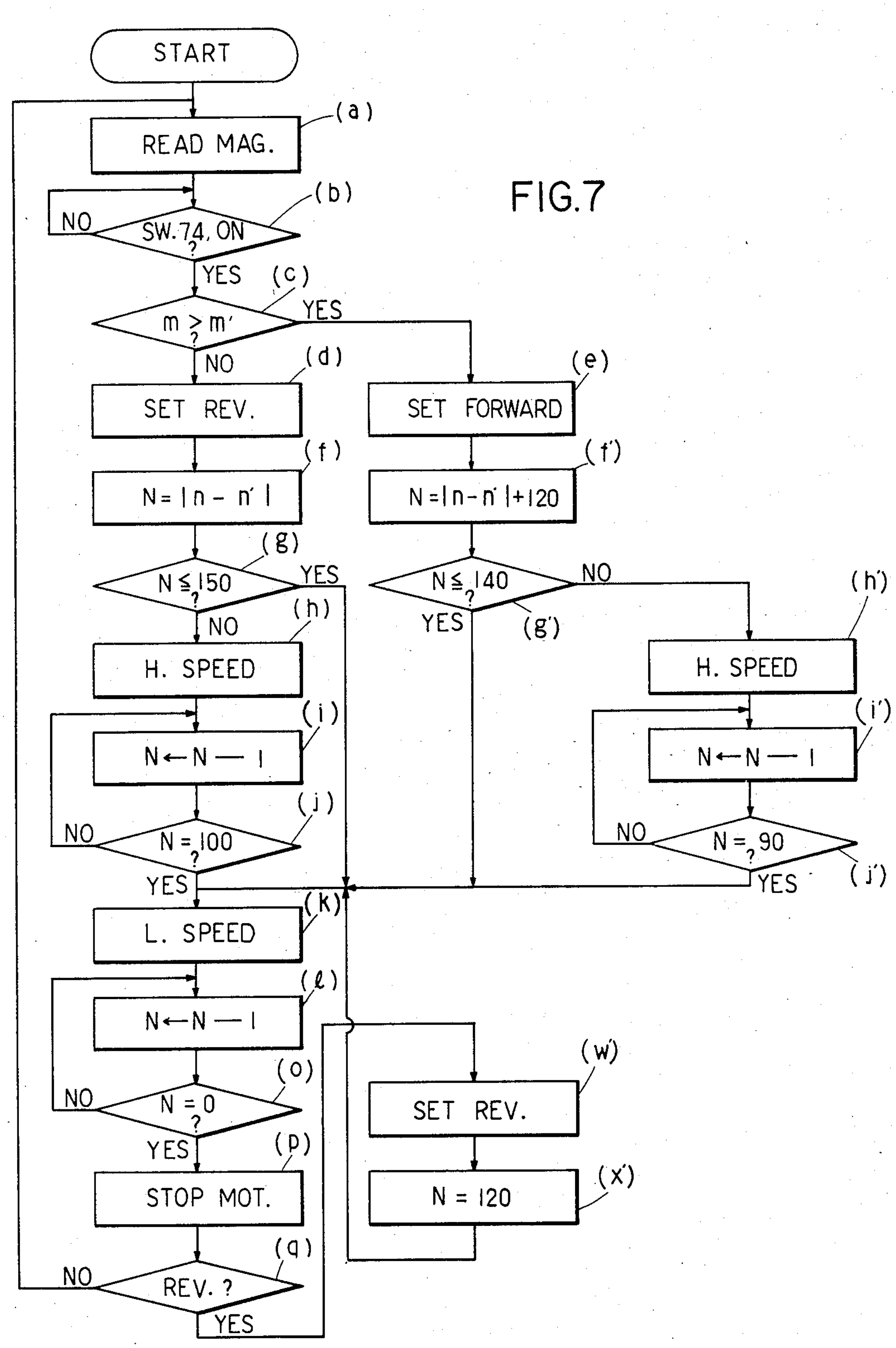
FIG. 7 is a flow chart of a control operation in another embodiment.

In the embodiment shown in FIG. 6, the judgement that the zoom lens 3 should be moved first at the higher speed or at lower speed from the beginning in the direction B is based on whether or not the initial position is spaced away from the goal position over a predetermined distance as in the case that the zoom lens 3 is moved in the direction A from the beginning. However, where the zoom lens 3 is to be moved initially in the direction B as shown in FIG. 7, the above judgement may be based on whether or not the initial position is spaced away from the reversal position over a predetermined distance Ds'. In the embodiment shown in FIG. 7, the distances Ds and Dc through which the zoom lens 3 is to be moved initially in the direction A are respectively set to correspond to 150 and 100 clock pulses. The distance ΔD corresponds to 120 clock pulses; the distance Ds' corresponds to 140 clock pulses; and the distance Dc' corresponds to 90 clock pulses. In this connection, the distance Dc' represents a position spaced away from the reversal position of the zoom lens 3 in the direction B.

In FIG. 7, the motor is energized in the same manner as in the case referred to in connection with FIG. 6, if the goal position is in the direction A as viewed from the initial position. If the goal position is in the direction B as viewed from the initial position, the rotational direction of the motor 48 is set in the forward direction at Step e. Subsequently, the microcomputer 72 calculates the number of clock pulses N which is in turn set in its counter section. This number N corresponds to a distance (D+ΔD) and thus is equal to $|n-n'|+120$. At Step g', the distance (D+ΔD) is compared with said distance Ds'. In other words, it is discriminated whether or not the number of clock pulses ($|n-n'|+120$) is smaller. If this number is smaller, the program proceeds from the Step g' to Step k.

If the above number ($|n-n'|+120$) is not smaller, this means that the initial position is spaced away from the reversal position by the distance Ds'. Thus, the motor 48 is energized to rotate at the higher speed at Step h' so that time required to change the magnification can be reduced. At Step j', if it is discriminated that the remaining number of clock pulses to be counted is equal 90, this means that the zoom lens 3 has been moved from the reversal position by the distance Dc'. Therefore, the program proceeds to Step k.

If the goal position is in the second direction relative to the initial position, Step q judges "Yes". Therefore, the rotational direction of the motor 48 is set to be in the rearward direction at Step w'. Next, at Step x', the number of clock pulses corresponding to the distance ΔD is set to be equal to 120 in the counter section of the microcomputer. Subsequently, the program proceeds to Step k.

In the above embodiments, the distance Ds is different from the distance Ds' while the distance Dc is distinguished from the distance Dc'. However, the distances Ds and Ds' may be equal to each other while the distances Dc and Dc' may be equalized. In this case, the program proceeds from Step f' to Step g with the Steps g', h', i' and j' being omitted.

Furthermore, where the distances ΔD and Ds' are set to be equal to 150 clock pulses while the distance Dc' is established to be equal to 100 clock pulses, the program may proceed from Step f' to Step h with the steps g', h', i' and j' being omitted.

In this manner, the well-known copying operation including the scanning of the original is initiated when a copy key is turned on after the position and focal length of the zoom lens have been set in accordance with a selected magnification. When the copy key is turned on, the program may be initiated from Step a. In this case, Step b is omitted. The copying operation may be carried out after it has been discriminated that the motor had been rotated rearwardly at Step q or immediately when "No" is detected at Step b.

Although the previous embodiments have been described as to the microcomputer 72 including the table of FIG. 5 stored in its memory, the program in the microcomputer 72 may include a formula $P=f(M)$ indicative of a relationship between a magnification M and the number of clock pulses P corresponding to a distance between the reference position and a position corresponding to the magnification M. The value P may first be calculated in accordance with the selected magnification and then the aforementioned number of clock pulses N may be calculated.

Figure 8:
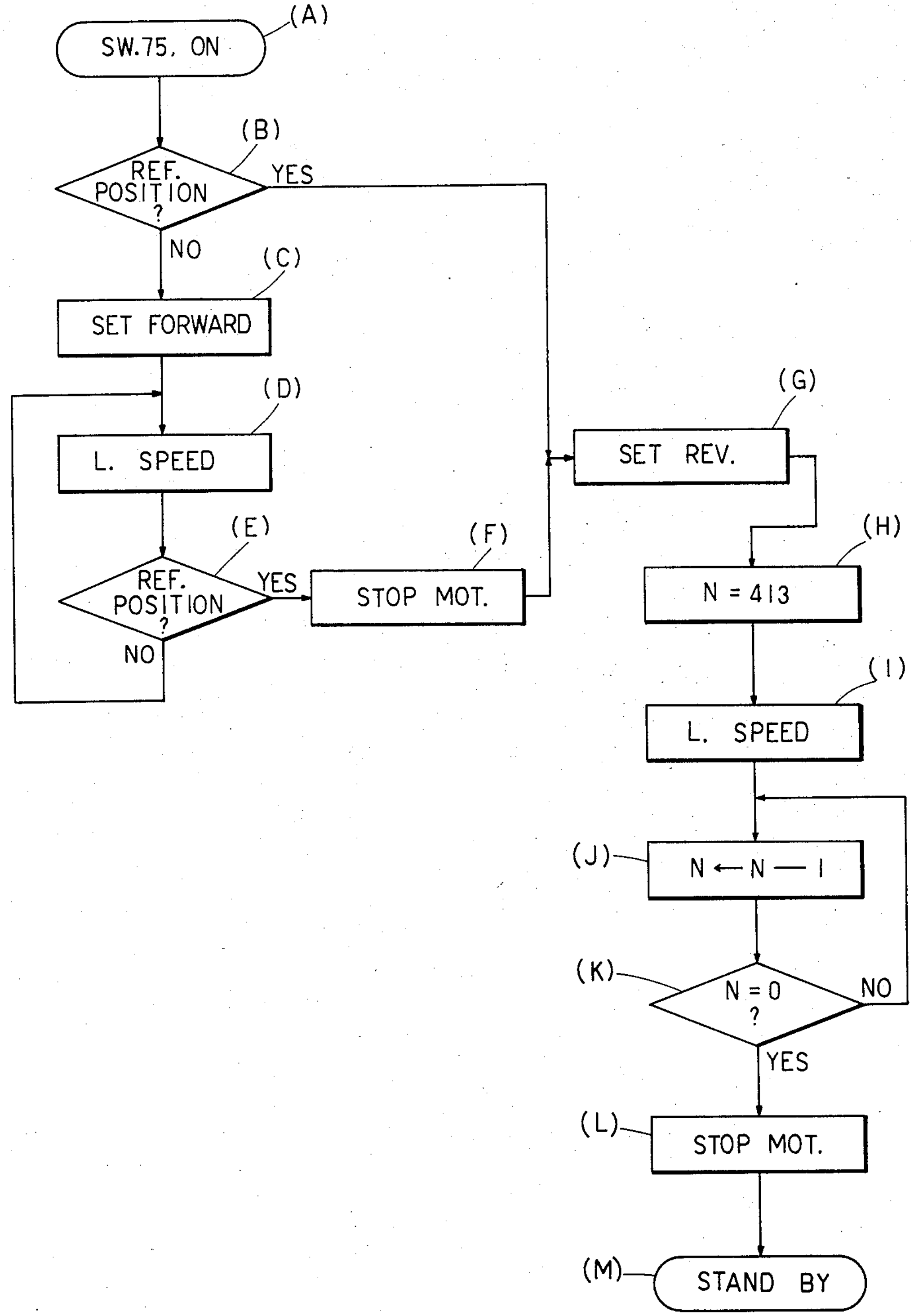
FIG. 8 is a flow chart of a control operation in one embodiment of the present invention.

FIG. 8 is a flow chart of the control of the motor such that after the power switch has been closed and before the copying system is possible to operate, the zoom lens is once returned to the reference position and then set at a position in which a copy is effected in the one-to-one magnification. First of all, the power switch 75 is closed to energize the copying system at Step A. At this time, the microcomputer 72 receives a signal from the switch 59 to discriminate whether or not the zoom lens 3 is in the reference position Ms shown in FIG. 2 (Step B).

If the zoom lens 3 is in the reference position, the microcomputer 72 provides a control signal to the rotation changing circuit 71 such that the servo motor 48 will be rotated rearwardly. If the zoom lens 3 is not in the reference position, the microcomputer 72 generates another control signal which is in turn supplied to the rotation changing circuit 71 such that the servo motor 48 will be rotated forwardly (Steps C and G).

After the rotation changing circuit 71 has been switched to its state that the motor 48 will be rotated forwardly, the microcomputer 72 provides a control signal to the voltage changing circuit 70 such that the servo motor 48 will be rotated forwardly at the lower speed (Step D). Accordingly, the zoom lens 3 will be moved in the direction B.

If the zoom lens 3 reaches the reference position, the switch 59 will be turned on by the projection 59' on the lens carriage 39. The microcomputer 72 receives a signal from the actuated switch 59 and then generates a stop signal which is in turn provided to the voltage changing circuit 70 so that the servo motor 48 will be stopped (Step F). Because the zoom lens 3 has reached the reference position Mc, the microcomputer operates to switch the rotation changing circuit 71 such that the servo motor 48 will be rotated rearwardly (Step G).

As described in connection with FIG. 5, the number of clock pulses corresponding to the distance between the reference position of the zoom lens 3 (corresponding to 142% of the magnification) and the one-to-one magnification (100%) is equal to 413. Therefore, the microcomputer 72 sets the number of clock pulses N at 413 in the counter section (Step H). Subsequently, the microcomputer 72 provides to the voltage changing circuit 70 such a control signal that rotates the servo motor 48 at the lower speed in the rearward direction (Step I). Therefore, the zoom lens 3 will be moved in the direction A and at the same time the encoder disc 49 is rotated to generate clock pulses from the photo-interrupter 50. These clock pulses are counted by the microcomputer 72 with the counted number being subtracted from the set number of clock pulses (413) (Step J). If this difference becomes equal to zero, the microcomputer 72 generates a control signal which is in turn supplied to the voltage changing circuit 70 such that the servo motor 48 will be stopped (Steps K and L). Therefore, the zoom lens 3 will be set at a position corresponding to the one-to-one magnification and wait the next copy instruction. It is of course that the focal length of the zoom lens 3 will be set at a value matching the one-to-one magnification as described hereinbefore.

In the embodiment of FIG. 8, the speed of the servo motor 48 may be higher. Since more time is often required until the copying system reaches its copyable state after the power switch 75 is turned on, however, the motor 48 may be operated at the lower speed. This is preferred since error can be reduced when the zoom lens 3 is positioned.

The zoom lens 3 may be moved to the reference position after the power switch has been closed and before the copying system is copyable and then remained at the reference position until the next copy instruction is provided thereto. In this case, the zoom lens 3 is moved to a position corresponding to the selected magnification under the first copy instruction.

Although the previous embodiments have been described as to the encoder disc 49 rotated by the motor 48 to generate clock pulses, the present invention may utilize the other pulse generating means such as a transparent and linear encoder plate including a plurality of opaque lines formed thereon. This encoder plate is disposed along the guide rail 40 shown in FIGS. 2 and 3. A photo-interrupter is attached to the lens carriage 39. Clock pulses may be generated by the relative movement between the photo-interrupter and the encoder plate. A crystal oscillator may be utilized in the present invention. In this case, the motor 48 may be replaced by a pulse motor driven by clock pulses from the crystal oscillator.

Furthermore, the position of the zoom lens may be controlled by detecting resistance, current or voltage which is in turn converted into digital signals.

The present invention can be applied to such a system that uses photoelectric converter for forming electric signals corresponding light images from CCD's and others as photosensitive elements. In this case, the output of the photoelectric converter may be used to reproduce the image of an original in its real, worked or edited state by the use of a laser beam printer, ink-jet printer, thermal printer or the others.

While the invention has been described with reference to the structures disclosed herein, it is not confined to the details set forth and this application is intended to cover such modifications or changes as may come within the purposes of the improvements or the scope of the following claims.

What is claimed is:

1. A variable magnification image projecting apparatus for projecting the image of an original onto a photosensitive member with a selected magnification, said apparatus comprising:

a zoom lens for forming an image of the original on the photosensitive member;

lens drive means for moving said zoom lens along a predetermined path;

focal-length changing means for changing the focal length of said zoom lens in association with the operation of said lens drive means; and control means for controlling said lens drive means such that in response to a selected magnification, said zoom lens is shifted to a goal position spaced away from an initial position of said zoom lens by a distance D and such that the focal length of said zoom lens is changed to a value corresponding to the selected magnification, said control means controlling said lens drive means such that said zoom lens is moved through the distance D in the first direction when said goal position corresponding to the selected magnification is far in a first direction as viewed from said initial position and such that when said goal position corresponding to the selected magnification is far in a second direction opposite to the first direction as viewed from said initial position, said zoom lens is moved to a reversal position spaced away from said initial position by a distance $(D+\Delta D)$ in the second direction and then moved back by a distance $\Delta D$ is the first direction.

2. A variable magnification image projecting apparatus as defined in claim 1, wherein said control means includes clock pulse generating means and is adapted to count clock pulses generated by said clock pulse generating means and to control the movement of said zoom lens in accordance with the counted number of clock pulses.

3. A variable magnification image projection apparatus as defined in claim 2, wherein said control means is adapted to once move said zoom lens to one reference position after a power switch has been closed and then move said zoom lens from said reference position to a position corresponding to a predetermined magnification.

4. A variable magnification image projection apparatus as defined in claim 3, wherein said control means includes lens position detecting means for detecting said zoom lens when it reaches said reference position.

5. A variable magnification image projecting apparatus as defined in claim 2, wherein said clock pulse generating means is adapted to generate clock pulses in association with the operation of said lens drive means.

6. A variable magnification image projecting apparatus as defined in any one of claims 1, 2 and 5, wherein said focal-length changing means includes a first stationary member and a second movable member adapted to move and rotate in association with the movement of said zoom lens to change the focal length of said zoom lens, said second member being connected mechanically with said first member such that said second member will be rotated under the reaction of said first member during the movement of said zoom lens.

7. A variable magnification image projecting apparatus as defined in claim 6, wherein said first member is in the form of a cam member and said second member is in the form of a zoom ring member and wherein said second member is mechanically connected with said first member through a driven member which slidably engages said cam member.

8. A variable magnification image projecting apparatus as defined in claim 6, wherein said first member is in the form of a rack member and wherein said second member is mechanically connected with said first member through a gearing mechanism which engages said rack member.

9. A variable magnification image projecting apparatus as defined in claim 8, wherein said rack member is in the form of a helical rack member and said second member is in the form of a zoom ring member which includes a helical gear section engaging said helical rack member.

10. A variable magnification image projecting apparatus as defined in any one of claims 1, 2 and 5, wherein said lens drive means is selectively operable at a higher or lower speed and wherein said control means is adapted to operate said lens drive means at the higher speed until said zoom lens reaches a speed changing position forwardly spaced away from said goal position by a second predetermined distance when said goal position is in the first direction as viewed from said initial position and if said distance D is larger than the first predetermined distance, to operate said lens drive means at the lower speed during the movement of said zoom lens between said speed changing position and said goal position and to operate said lens drive means at the lower speed during the movement of said zoom lens between said initial position and said goal position when said goal position is in the first direction as viewed from said initial position and if said distance D is smaller than said first predetermined distance.

11. A variable magnification image projecting apparatus as defined in claim 10, wherein said control means is adapted to operate said lens drive means at the lower speed during the movement of said zoom lens between said reversal position and said goal position in the first direction.

12. A variable magnification image projecting apparatus as defined in claim 11, wherein said control means is adapted to operate said lens drive means at the higher speed until said zoom lens reaches a second speed changing position forwardly spaced away from said reversal position by a fourth predetermined distance and to operate said lens drive means at the lower speed until said zoom lens moves from said second speed changing position to said reversal position when said goal position is in the second direction as viewed from said initial position and if said distance D is larger than a third predetermined distance; and said control means is adapted to operate said lens drive means at the lower speed until said zoom lens moves from said initial position to said reversal position when said goal position is in the second direction as viewed from said initial position and if said distance D is smaller than said third predetermined distance.

13. A variable magnification image projecting apparatus for projecting the image of an original onto a photosensitive member with a selected magnification, said apparatus comprising:

a zoom lens for forming an image of the original on the photosensitive member;

lens drive means for moving said zoom lens along a predetermined path, said lens drive means including a drive and a mechanism for transmitting a driving force from said drive to said zoom lens;

focal-length changing means mechanically connected with said drive for changing the focal length of said zoom lens in association with the operation of said lens drive means;

pulse generating means mechanically connected with said drive for producing clock pulses in association with the operation of said lens drive means; and control means for counting clock pulses generated by said pulse generating means and for controlling a shift and focal length of said zoom lens to match the selected magnification in accordance with the counted number of clock pulses, said control means controlling said lens drive means such that said zoom lens is moved from an initial position thereof through a distance D in a first direction when a goal position corresponding to the selected magnification is far in the first direction as viewed from said initial position and such that when said goal position is far in the second direction opposite to said first direction as viewed from said initial position, said zoom lens will be moved from said initial position to a reversal position spaced away from said initial position by a distance $(D+\Delta D)$ in the second direction and then moved from said reversal position through a distance $\Delta D$ in the first direction and wherein said distance D is a distance between said initial position and said goal position and said distance $\Delta D$ is a fixed distance independently of the selected magnification.

14. A variable magnification image projecting apparatus as defined in claim 13, wherein said focal-length changing means includes a first stationary member and a second movable member moving and rotating in association with the operation of said lens drive means to change the focal length of said zoom lens, said second movable member being mechanically connected with said first stationary member rotate under the reaction of said first member during the movement of said zoom lens.

15. A variable magnification image projecting apparatus as defined in claim 14, wherein said first member is in the form of a cam member and said second member is in the form of a zoom ring member and wherein said second member is mechanically connected with said first member through a driven member which slidably engages said cam member.

16. A variable magnification image projecting apparatus as defined in claim 14, wherein said first member is in the form of a rack member and wherein said second member is mechanically connected with said first member through a gearing mechanism which engages said rack member.

17. A variable magnification image projecting apparatus as defined in claim 16, wherein said rack member is in the form of a helical gear rack member and said second member is in the form of a zoom ring member having a helical gear section which engages said helical gear rack member.

18. A variable magnification image projecting apparatus as defined in any one of claims 13 through 17, wherein said drive is in the form of a reversible motor and wherein said control means is adapted to control the rotational direction and amount of said reversible motor matching the selected magnification.

19. A variable magnification image projecting apparatus as defined in any one of claims 13 through 17, wherein said control means is adapted to once move said zoom lens to one reference position after a power switch has been closed and then move said zoom lens from said reference position to a position corresponding to a predetermined magnification.

20. A variable magnification image projecting apparatus as defined in claim 19, wherein said control means includes lens position detecting means for detecting said zoom lens when it reaches said reference position.

21. A variable magnification image projecting apparatus as defined in claim 20, wherein said predetermined magnification is one.

22. A variable magnification image projecting apparatus as defined in claim 21, wherein said drive is in the form of a reversible motor and wherein said control means is adapted to control the rotational direction and amount of said reversible motor matching a selected magnification.

23. A variable magnification image projecting apparatus as defined in any one of claims 13 through 17, wherein said drive is in the form of a reversible motor which is selectively operable at a higher or lower speed and wherein said control means is effective such that when said goal position is in the first direction as viewed from said initial position and if said distance D is larger than a first predetermined distance, said reversible motor will be operated at the higher speed in a first rotational direction until said zoom lens reaches a speed changing position forwardly spaced away from said goal position by a second predetermined distance and operated at the lower speed in the first rotational direction during the movement of said zoom lens from said speed changing position to said goal position and such that when said goal position is in the first direction as viewed from said initial position and if said distance D is smaller than said first predetermined distance, said reversible motor will be operated at the lower speed in the first rotational direction until said zoom lens moves from said initial position to said goal position.

24. A variable magnification image projecting apparatus as defined in claim 23, wherein said control means is adapted to operate said reversible motor at the lower speed in the first rotational direction during the movement of said zoom lens from said reversal position to said goal position in the first direction.

25. A variable magnification image projecting apparatus as defined in claim 24 wherein said control means is effective such that when said goal position is in the second direction as viewed from said initial position and if said distance D is larger than a third predetermined distance, said reversible motor will be operated at the higher speed in the second rotational direction opposite to said first rotational direction until said zoom lens reaches a second speed changing position forwardly spaced away from said reversal position by a fourth predetermined distance and operated at the lower speed in the second rotational direction during the movement of said zoom lens from said second speed changing position to said reversal position and such that when said goal position is in the second direction as viewed from said initial position and if said distance D is smaller than said third predetermined distance, said reversible motor will be operated at the lower speed in the second rotational direction during the movement of said zoom lens from said initial position to said reversal position.

26. A variable magnification image projecting apparatus for projecting the image of an original onto a photosensitive member with a selected magnification, said apparatus comprising:

zoom lens for imaging the image of the original on the photosensitive member;

lens drive means including a motor selectively operable at a higher or lower speed and a mechanism for transmitting a driving force from said motor to said zoom lens and said drive means moving said zoom lens along a predetermined path, said lens drive means being selectively operable at a higher or lower speed;

focal-length changing means mechanically connected with said lens drive means for changing the focal length of said zoom lens in association with the operation of said lens drive means, said focal-length changing means including a first stationary member and a second movable member moving and rotating in association with the movement of said zoom lens to change the focal length of said zoom lens, said second member being mechanically connected with said first member such that said second member will be rotated by the reaction of said first member during the movement of said zoom lens;

pulse generating means for generating clock pulses; and control means for counting clock pulses generated by said pulse generating means and for controlling the shift and focal length of said zoom lens to match the selected magnification in accordance with the counted number of clock pulses, said control means being such that when a distance D from the initial position of said zoom lens and a goal position of the same corresponding to be selected magnification is larger than a first predetermined distance, said lens drive means will be operated at the higher speed until said zoom lens reaches a speed changing position forwardly spaced away from said goal position by a second predetermined distance and operated at the lower speed during the movement of said zoom lens from said speed changing position to said goal position and such that when said distance D is smaller than said first predetermined distance, said lens drive means will be operated at the lower speed during the movement of said zoom lens from said initial position to said goal position.

27. A variable magnification image projecting apparatus as defined in claim 26, wherein said first predetermined distance is larger than said second predetermined distance.

28. A variable magnification image projecting apparatus as defined in claim 26, wherein said first and second predetermined distances are equal to each other.

29. A variable magnification image projecting apparatus as defined in claim 26, wherein said pulse generating means is mechanically connected with said motor to generate clock pulses in association with the operation of said motor.

30. A variable magnification image projecting apparatus as defined in claim 26, wherein said first member is in the form of a cam member and said second member is in the form of a zoom ring member and wherein said second member is mechanically connected with said first member through a driven member which slidably engages said cam member.

31. A variable magnification image projecting apparatus as defined in claim 26, wherein said first member is in the form of a rack member and wherein said second member is mechanically connected with said first member through a gearing mechanism which engages said rack member.

32. A variable magnification image projecting apparatus as defined in claim 31, wherein said rack member is in the form of a helical gear rack member and wherein said second member is in the form of a zoom ring member having a helical gear section which engages said helical gear rack.

* * * * *